United States Patent
Hong

(10) Patent No.: US 11,981,425 B2
(45) Date of Patent: May 14, 2024

(54) SYSTEM AND METHOD FOR CONTROLLING SAFETY DEVICES OF ROTARY-WING AIRCRAFT

(71) Applicant: HYUNDAI MOBIS CO., LTD., Seoul (KR)

(72) Inventor: Dae Hoon Hong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 47 days.

(21) Appl. No.: 17/825,281

(22) Filed: May 26, 2022

(65) Prior Publication Data

US 2023/0242247 A1 Aug. 3, 2023

(30) Foreign Application Priority Data

Jan. 28, 2022 (KR) .......................... 10-2022-0013325

(51) Int. Cl.
*B64C 27/00* (2006.01)
*B64D 45/00* (2006.01)

(52) U.S. Cl.
CPC ............ *B64C 27/006* (2013.01); *B64D 45/00* (2013.01); *B64D 2045/0085* (2013.01)

(58) Field of Classification Search
CPC ...................... B64C 27/006; B64D 2045/0085
See application file for complete search history.

(56) References Cited

U.S. PATENT DOCUMENTS

| | | | | |
|---|---|---|---|---|
| 5,992,794 A | * | 11/1999 | Rotman | ................ B64C 25/56 244/17.17 |
| 11,685,531 B1 | * | 6/2023 | Mower | ................ B64D 11/062 244/129.1 |
| 2010/0276540 A1 | | 11/2010 | Rojo | |
| 2021/0005077 A1 | * | 1/2021 | Harrison | ................ B64D 45/00 |
| 2021/0309385 A1 | * | 10/2021 | Quintana | ............... B64D 45/00 |
| 2022/0009642 A1 | * | 1/2022 | Shen | ......................... B01J 7/00 |

FOREIGN PATENT DOCUMENTS

| | | |
|---|---|---|
| KR | 10-2017-0017365 A | 2/2017 |
| KR | 10-2017-0114353 A | 10/2017 |
| KR | 10-2096777 B1 | 3/2020 |
| KR | 10-2021-0010166 A | 1/2021 |

\* cited by examiner

*Primary Examiner* — Tien Q Dinh
*Assistant Examiner* — William L Gmoser
(74) *Attorney, Agent, or Firm* — Novo TechIP International PLLC

(57) ABSTRACT

Proposed is a system and method of controlling safety devices of a rotary-wing aircraft, the system and method preventing indiscreet operation of safety devices by automatically or manually deploying the safety devices in accordance with the risk levels of accidents. The system includes sensors configured to detect motions of the aircraft, and a controller configured to control risk levels of accidents in flight on the basis of signals from the sensors and configured to control safety devices mounted on the aircraft to be automatically or manually operated, depending on risk levels of accidents.

11 Claims, 2 Drawing Sheets

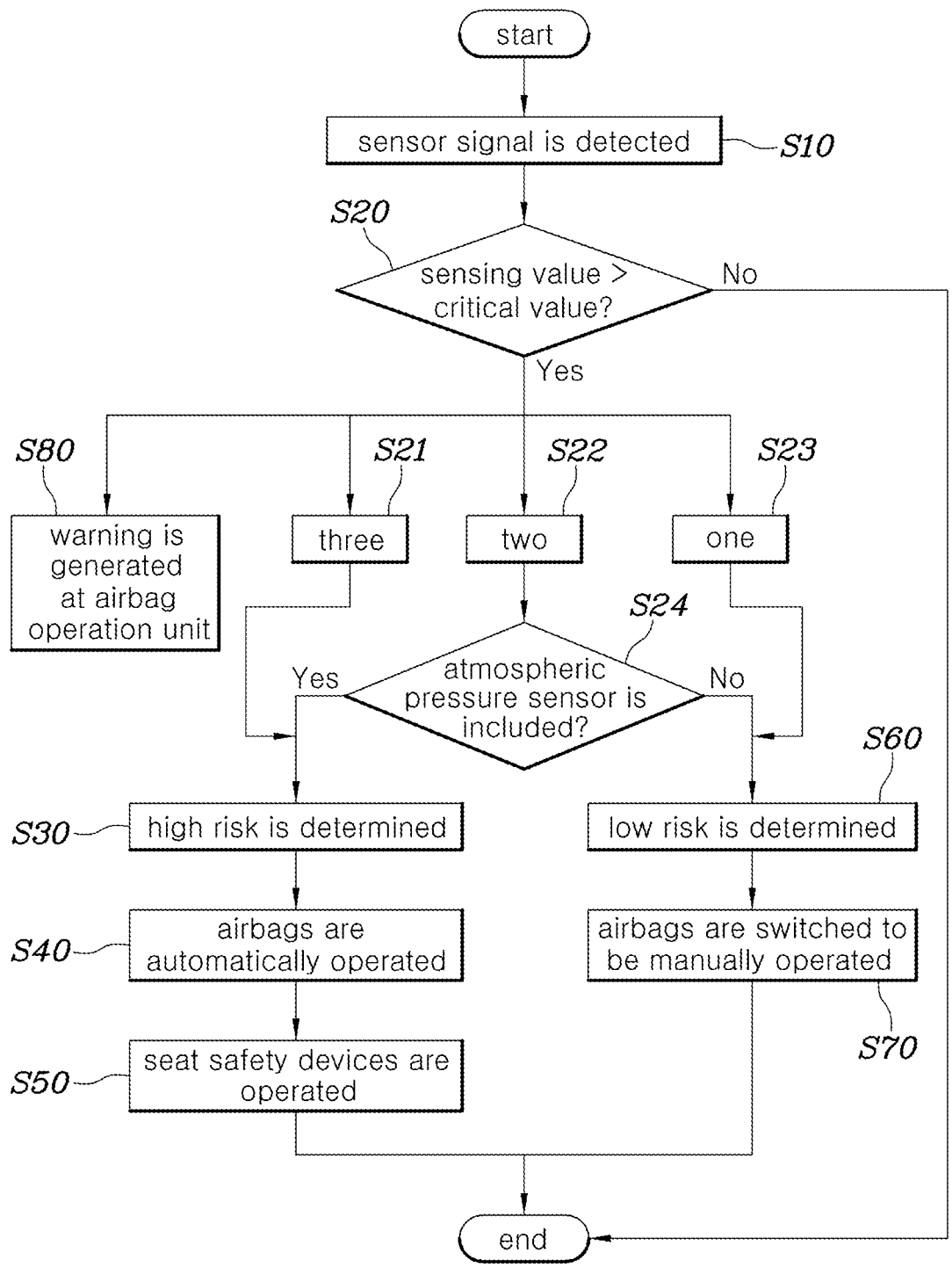

SYSTEM AND METHOD FOR CONTROLLING SAFETY DEVICES OF ROTARY-WING AIRCRAFT

CROSS-REFERENCE TO RELATED APPLICATIONS

The present application claims priority to Korean Patent Application No. 10-2022-0013325, filed Jan. 28, 2022, the entire contents of which is incorporated herein for all purposes by this reference.

BACKGROUND

1. Technical Field

The present invention relates to a system and method of controlling safety devices of a rotary-wing aircraft, the system and method preventing indiscreet operation of safety devices by automatically or manually deploying the safety devices in accordance with the risk levels of accidents.

2. Discussion of Related Art

Aircraft are not equipped with airbags or the rate of using airbags is low in the related art.

Accordingly, when an aircraft accident occurs, it is possible to protect the passengers when using airbags, but there is a problem that the passengers may be injured or die when airbags are not used.

Further, even if an aircraft is equipped with airbags, there is a problem that the airbags are indiscreetly operated even in slight accidents other than severe accidents.

The description provided above as a related art of the present invention is just for helping to understand the background of the present invention and should not be construed as being included in the related art known by those skilled in the art.

SUMMARY

The present invention has been made in an effort to solve the problems described above and an objective of the present invention is to provide a system and method of controlling safety devices of a rotary-wing aircraft, the system and method preventing indiscreet operation of safety devices by automatically or manually deploying the safety devices in accordance with the risk levels of accidents.

In order to achieve the objectives, a system for controlling safety devices of a rotary-wing aircraft includes; sensors configured to detect motions of the aircraft; a controller configured to determine risk levels of accidents in flight on the basis of signals detected from the sensors and configured to control the safety devices mounted on the aircraft to be automatically or manually operated, depending on risk levels of accidents.

The controller may compare sensing values from the sensors with critical values and determine the risk levels of accidents on the basis of the number of sensors detecting risk in which sensing values exceed critical values.

A high risk level may be determined when the number of sensors detecting risk exceeds a half; and a low risk level may be determined when there are sensors detecting risk but the number of the sensors detecting risk does not exceed a half.

Risk levels of accidents may be determined on the basis of kinds of the sensors detecting risk.

The sensors may be an atmospheric pressure sensor configured to detect up/down motions of the aircraft and a rotation detection sensor configured to detect rotational motions, in which when the atmospheric pressure sensor and the rotation detection sensor are sensors detecting risk, a high risk level may be determined; and when one of the atmospheric pressure sensor and the rotation detection sensor is a sensor detecting risk, a low risk level may be determined.

The rotation detection sensor may include a geomagnetic sensor and a 6-axis sensor.

The controller may control the safety devices to be automatically operated when determining a high risk level and may control the safety devices to be able to be manually operated when determining a low risk level.

When a sensing value exceeds a critical value, a warning may be generated at each of operation units configured to operate the safety devices.

A method of controlling safety devices of a rotary-wing aircraft of the present invention includes: a risk determination step in which a controller determines risk levels of accidents in flight on the basis of signals from sensors that reflect motions of the aircraft; an operation control step in which the controller controls the safety devices mounted on the aircraft to be automatically or manually operated, depending on risk levels of accidents.

The risk determination step may compare sensing values from the sensors with critical values and determine the risk levels of accidents on the basis of the number of sensors detecting risk in which sensing values exceed critical values.

The operation control step may control the safety devices to be automatically operated when determining a high risk level, and may control the safety devices to be able to be manually operated when determining a low risk level.

According to the system and method of the present invention, there is an effect of keeping passengers in an aircraft safe by automatically operating the safety devices in an urgent aircraft accident.

Further, in a slight accident of an aircraft, indiscreet operation of safety devices is prevented by the safety devices are controlled to be manually operated and only airbags that do not interfere with the visual field for piloting are selectively operated, so the passengers are protected from shock of the accident and stability in piloting of the pilot is not deteriorated, thereby preventing the accident from resulting in a large accident.

BRIEF DESCRIPTION OF THE DRAWINGS

The above and other objectives, features and other advantages of the present invention will be more clearly understood from the following detailed description when taken in conjunction with the accompanying drawings, in which:

FIG. 2 is a flowchart for explaining a process of controlling operation of safety devices of a rotary-wing aircraft according to the present invention.

DETAILED DESCRIPTION

Figure 1:
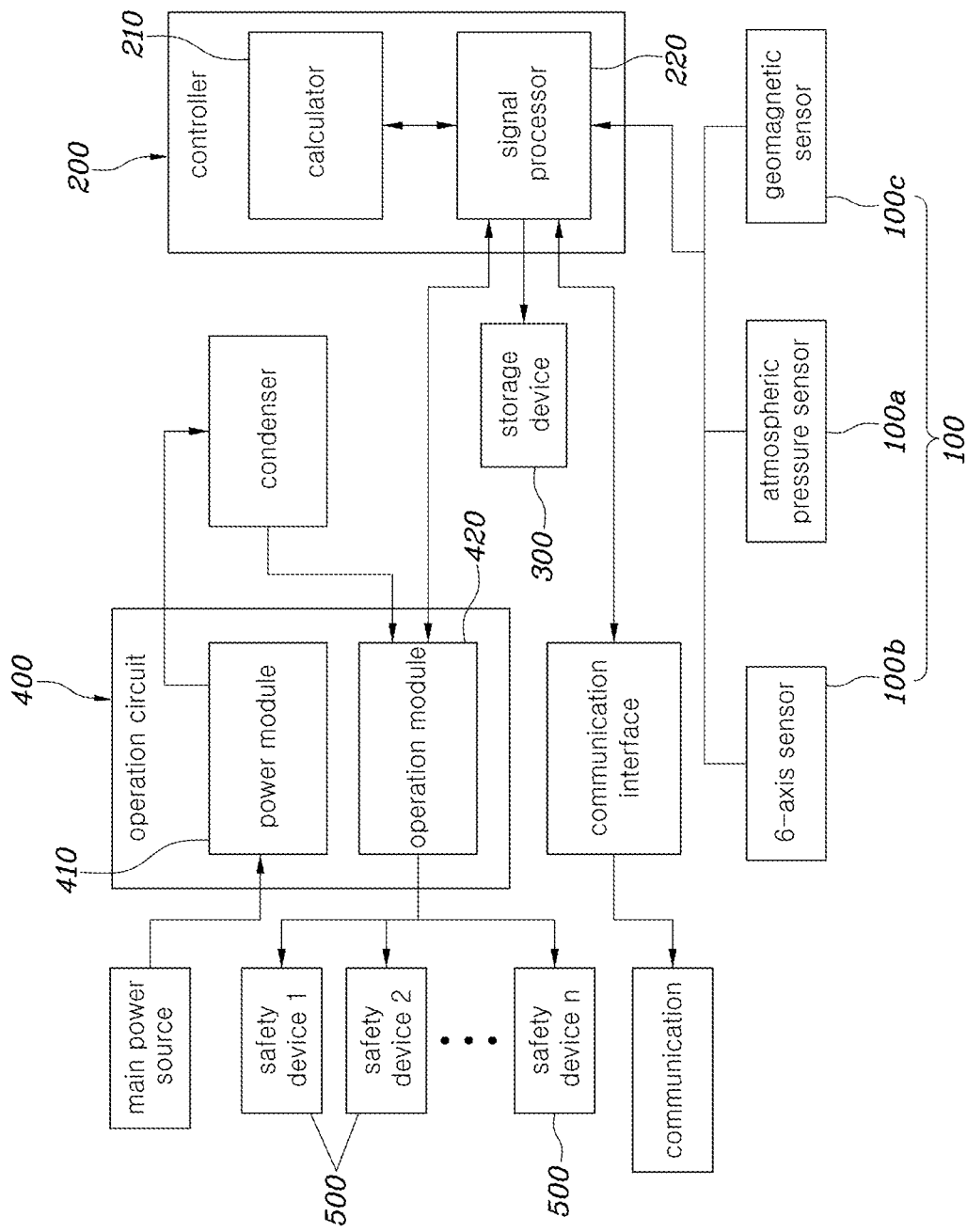
FIG. 1 is a block diagram schematically showing the configuration of a system for controlling safety devices of a rotary-wing aircraft according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all modifications, equivalents, and substitutions are included in the scope and spirit of the present invention.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments of the present invention are described hereafter in detail with reference to the accompanying drawings.

The present invention can be applied to aircraft such as an Urban Air Mobility (UAM), a Personal Air Vehicle (PAV), etc., including a helicopter, and FIG. 1 is a block diagram schematically showing the configuration of a system for controlling safety devices of a rotary-wing aircraft according to an embodiment of the present invention.

Referring to the figure, the system includes: sensors 100 that detect motions of an aircraft; and a controller 200 that determines the risk levels of accidents in flight on the basis of detection signals from the sensors 100 and automatically or manually operates safety devices 500 mounted in the aircraft.

According to the configuration of the present invention, in detail, the sensors 100 includes an atmospheric pressure sensor 100a that detects up/down motions of an aircraft by sensing the altitude of the aircraft, a rotation detection sensor that detects a rotational motion of an aircraft, etc.

The rotation detection sensor may be a 6-axis sensor 100b and/or a geomagnetic sensor 100c. The 6-axis sensor 100b can detect 3-axis acceleration/deceleration variations of an aircraft and the geomagnetic sensor 100c can detect a rotational motion of an aircraft by detecting azimuth variations of the aircraft.

The safety devices 500, which may be a seat and various types of airbags that are deployed inside and outside an aircraft, may include not only a side airbag and a curtain airbag, which re installed on a side of a seat, in addition to a cockpit airbag installed at a cockpit, but also an airbag installed at a roof, a helmet type airbag, an external airbag, etc., and may further include various other types of airbags.

In particular, when detection signals is input to a signal processor 220 from the sensors 100, the controller 200 performs calculation on the input signals through a calculator 210 using a predetermined algorithm and the calculation result is provided to the signal process, whereby the flight state of an aircraft is monitored. That is, the controller 200 predicts a crash of an aircraft, determines a collision state, determines whether to operate the safety devices 500, etc.

Further, it is possible to diagnose the state of the controller 200 through the signal processor 220 on the basis of signals or detection values provided from the sensors 100, it is possible to store an accident record by collecting accident information and transmitting the accident record to a storage device 300 in an aircraft accident, and communication connection with the outside can be achieved through various communication interfaces.

An operation circuit 400 that operates the safety devices 500 in accordance with an operation instruction transmitted from the signal processor 220 is provided.

The operation circuit 400 includes a power unit 410 that is supplied with power from a main power source, and an operation module 420 that is activated by power to operate the safety devices 500 in response to an operation instruction from the controller 420. The system may further include a condenser that supplies power to the operation power when main power is disconnected.

That is, according to this configuration, the system keeps passengers in an aircraft safe by automatically operating the safety devices 500 in an urgent aircraft accident, but controls the safety devices 500 to be manually operated in a slight aircraft accident, thereby preventing the safety devices 500 from being indiscreetly operated.

The controller 200 can compare sensing values from the sensors 100 with predetermined values (e.g., critical values) and can determine the risk levels of accidents on the basis of the number of sensors detecting risk in which sensing values exceed the predetermined values (e.g., critical values).

For example, when sensing values obtained by the sensors 100 in accordance with piloting input of an aircraft exceed set critical values by greatly departing from fundamental sensing values, sensors detecting risk exceeding critical values are detected and the number of the detected sensors detecting risk is secured, whereby the accident risk level is determined.

In detail, it is possible to determine a high risk level when the number of sensors detecting risk exceeds a half and it is possible to determine a low risk level when there are sensors detecting risk but the number of the sensors detecting risk does not exceed a half.

For example, when three sensors 100 are used as sensors 100 for detecting the motion of an aircraft and two or more of the three sensors 100 are detected as sensors detecting risk, the accident level of the aircraft is determined as a high risk level.

However, when only one of the three sensors 100 is detected as a sensor detecting risk, the accident level of the aircraft is determined as a low risk level.

Of course, when all of the three sensors 100 are not detected as sensors detecting risk, it is determined as a normal state in which the aircraft is normally cruised.

Further, according to the present invention, it is possible to compare sensing values from the sensors 100 with critical values and determine the risk levels of accidents on the basis of the kinds or types of sensors detecting risk in which sensing values exceed critical values.

For example, when sensing values obtained by the sensors 100 in accordance with piloting input of an aircraft exceed set critical values by greatly departing from fundamental sensing values, sensors detecting risk exceeding critical values are detected and the types or kinds of the detected sensors detecting risk are secured, whereby the risk level of an accident is determined.

In detail, the sensors 100 may be an atmospheric pressure sensor 100a that detects up/down motions of an aircraft and a rotation detection sensor that detects a rotational motion, and in this case, it is possible to determine a high risk level when the atmospheric pressure sensor 100a and the rotation detection sensor are sensors detecting risk, and it is possible to determine a low risk level when one of the atmospheric pressure sensor 100a and the rotation detection sensor is a sensor detecting risk.

The rotation detection sensor may be a geomagnetic sensor 100c and a 6-axis sensor 100b.

For example, when the atmospheric pressure sensor 100a, geomagnetic sensor 100c, and the 6-axis sensor 100b are used as the sensors 100 that detect motions of an aircraft, and when all of the three sensors 100 are detected as sensors detecting risk, the risk level of the aircraft is determined as a high risk level.

When two of the three sensors 100 are detected as sensors detecting risk and the sensors detecting risk are the atmospheric pressure sensor 100a and the geomagnetic sensor 100c or the 6-axis sensor 100b as the result of determining the types or kinds of the sensors detecting risk, the risk level of the aircraft is determined as a high risk level.

In this case, the atmospheric pressure sensor 100a is used as a key sensor for determining an urgent situation. Accordingly, when the atmospheric pressure sensor 100a and the geomagnetic sensor 100c or the 6-axis sensor 100b are detected as sensors detecting risk, it is determined as an urgent situation such as a crash of the aircraft and all of the airbags on the aircraft are automatically deployed. Further, safety devices (e.g., a seatbelt pretensioner, etc.) installed on seats are also operated simultaneously with automatic operation of the airbags.

However, when sensors detecting risk are the geomagnetic sensor 100c or the 6-axis sensor 100b, not including the atmospheric pressure sensor 100a even though two sensors 100 are detected as sensors detecting risk, the risk level of the aircraft is determined as a low risk level.

In this case, since angular speed variations of the geomagnetic sensor 100c or the 6-axis sensor 100b that measure azimuth variations of an aircraft are considered as being based on the same operation principle to measure rotation of an aircraft, when only the geomagnetic sensor 100c or the 6-axis sensor 100b are detected as sensors detecting risk except the atmospheric pressure sensor 100a, it is not determined as a high risk level.

When only one of the three sensors 100 is detected as a sensor detecting risk, the accident level of the aircraft is determined as a low risk level regardless of the kind of the sensor detecting risk.

Of course, when all of the three sensors 100 are not detected as sensors detecting risk, it is determined as a normal state in which the aircraft is normally cruised.

As described above, whether the altitude of an aircraft and the atmospheric pressure are abnormally rapidly changed and a variation of the azimuth or speed of the aircraft are both sensed in accordance with signals or detection values from the sensors 100 on the aircraft such that the safety devices 500 are guided to automatically or manually deploy, thereby securing reliability in the operation of the safety devices and keeping passengers safe.

The controller 200 can control the safety devices 500 to be automatically operated when a high risk level is determined and can control the safety devices 500 to be manually operated when a low risk level is determined.

For example, when an urgent accident in which a pilot cannot make a decision occurs, all of the airbags installed in the aircraft are deployed, whereby not only absorbing shock due to the accident, but also keeping passengers safe from fragments.

Further, other safety devices installed in the aircraft other than the airbags are also operated, whereby further keeping the passengers safe.

However, when a slight accident in which a pilot can make a decision occurs, all of the airbags installed in the aircraft are switched to be able to be manually operated.

Accordingly, the pilot selectively operates only airbags that do not interfere with the visual field for piloting, so the passengers are protected from shock of the accident and stability in piloting of the pilot is not deteriorated, thereby preventing the accident from resulting in a large accident.

Further, according to the present invention, it is possible to generate a warning on operation units for operating the safety devices 50 when a sensing value exceeds a critical value.

For example, when even only one of three sensors 100 is detected as a sensor detecting risk, it does not mean a rapid crash situation or an urgent situation, but airbags should be able to be manually operated. Accordingly, a warning lamp at each airbag operation unit for manually operating each of the airbags is turned on, thereby informing passengers that the airbags can be manually operated.

Meanwhile, FIG. 2 is a flowchart for explaining a process of controlling operation of safety devices 500 of a rotary-wing aircraft according to the present invention.

Referring to the figure, a method of controlling safety devices 500 of a rotary-wing aircraft according to the present invention includes; a risk determination step in which a controller 200 determines the risk levels of accidents in flight on the basis of signals or detection values from sensors 100 that reflect motions of an aircraft; and an operation control step in which the controller 200 controls safety devices 500 mounted on the aircraft to be automatically or manually operated, depending on the risk levels of accidents.

For reference, the controller 200, which is a controller the same as the controller 200 shown in FIG. 1, can be implemented through a nonvolatile memory (not shown) configured to store algorithms for controlling operation of various components of an aircraft or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

The risk determination step can compare sensing values from the sensors 100 with critical values and can determine the risk levels of accidents on the basis of the number of sensors detecting risk in which sensing values exceed critical values.

It is possible to determine a high risk level when the number of sensors detecting risk exceeds a half, as the result of risk level determination, and it is possible to determine a low risk level when there are sensors detecting risk but the number of the sensors detecting risk does not exceed a half.

Further, it is also possible to determine the risk levels of accidents on the basis of the kinds of the sensors detecting risk.

To this end, the sensors 100 are an atmospheric pressure sensor 100a that detects up/down motions of an aircraft and a rotation detection sensor that detects a rotational motion, and the rotation detection sensors includes a geomagnetic sensor 100c and a 6-axis sensor 100b.

It is possible to determine a high risk level when the atmospheric pressure sensor 100a and the rotation detection sensor are sensors detecting risk; and it is possible to determine a low risk level when one of the atmospheric pressure sensor 100a and the rotation detection sensor is a sensor detecting risk.

Further, the operation control step can control the safety devices 500 to be automatically operated when a high risk level is determined and can control the safety devices 500 to be manually operated when a low risk level is determined.

When a low risk level is determined, a warning can be generated at operation units for manually operating the safety devices 500.

A process of operating airbags mounted on a rotary-wing aircraft is described with reference to FIG. 2.

Motions of an aircraft are monitored in flight through the atmospheric pressure sensor 100a, the geomagnetic sensor 100c, and the 6-axis sensor 100b (S10).

In the monitoring process, a sensing value detected by each sensor 100 in accordance with piloting input in the aircraft is compared with a critical value (S20), and the number of sensors 100 in which sensing values exceed critical values is determined.

When all of the three sensors 100, that is, the atmospheric pressure sensor 100a, the 6-axis sensor 100b, and the geomagnetic sensor 100c exceed the critical values (S21), as the result of determination in step S20, the accident level of the aircraft is diagnosed as a high risk level (S30).

Accordingly, all of the airbags are automatically operated and simultaneously safety devices installed on seatbelts are also operated (S40 and S50). Accordingly, passengers in addition to a pilot are protected from an urgent situation, thereby decreasing injury of the passengers.

Further, as the result of determination in step S20, it is determined whether two sensors 100 exceed critical values (S22) and whether the atmospheric pressure sensor 100a is included in the two sensors 100 (S24).

When the atmospheric pressure sensor 100a is included, as the result of determination in step S24, the accident level of the aircraft is determined as a high risk level (S30).

Accordingly, also in this case, the safety devices installed on the seatbelts are automatically operated with the airbags (S40 and S50), the passengers in the aircraft are kept safe.

However, as the result of determination in step S20, when two sensors 100 exceed critical values but the two sensors 100 are composed of only the geomagnetic sensor 100c and the 6-axis sensor 100b except the atmospheric pressure sensor 100a, the accident level of the aircraft is determined as a low risk level (S60).

In this case, the airbags are switched to be manually operated (S70).

Accordingly, only airbags that do not interfere with the visual field for piloting are selected and operated, so the passengers are protected from shock of the accident and stability in piloting of the pilot is not deteriorated, thereby preventing the accident from resulting in a large accident.

When one sensor 100 exceeds a critical value (S23), as the result of determination in step S20, the accident level of the aircraft is determined as a low risk level regardless of the kind of the sensor detecting risk (S60).

Accordingly, also in this case, the airbags are switched to be manually operated (S70).

Further, when sensing values exceed critical values in step S20, the number of corresponding sensors 100 is determined and a lamp at an operation unit for manually operating each of the airbags is turned on (S80), whereby desired airbags can be operated.

As described above, according to the present invention, when an urgent accident of an aircraft occurs, passengers in the aircraft are kept safe by automatically operating safety devices 500.

Further, in a slight accident of an aircraft, indiscreet operation of safety devices 500 is prevented by the safety devices 500 are controlled to be manually operated and only airbags that do not interfere with the visual field for piloting are selectively operated, so the passengers are protected from shock of the accident and stability in piloting of the pilot is not deteriorated, thereby preventing the accident from resulting in a large accident.

Although the present invention was described with reference to the detailed embodiments, it is apparent to those skilled in the art that the present invention may be changed and modified in various ways without the scope of the present invention and it should be noted that the changes and modifications are included in claims.

What is claimed is:

1. A system for controlling a safety device for a rotary-wing aircraft, the system comprising:
   a plurality of sensors, each configured to detect a motion of the rotary-wing aircraft and generate a detection value indicating the detected motion of the rotary-wing aircraft; and
   a controller configured to:
     determine an accident risk level during a flight of the rotary-wing aircraft based on the detection value generated from each sensor; and
     control the safety device positioned at the rotary-wing aircraft to operate automatically or manually based on the determined accident risk level,
   wherein, to determine the accident risk level, the controller is configured to:
     compare the detection value generated from each sensor with a predetermined value; and
     determine the accident risk level based on a number of the sensors outputting the detection value exceeding the predetermined value, and wherein, to determine the accident risk level, the controller is further configured to:
  determine that the accident risk level is high when the number of the sensors outputting the detection value exceeding the predetermined value exceeds a half of the number of the sensors; and
  determine that the accident risk level is low when the number of sensors outputting the detection value exceeding the predetermined value does not exceed the half of the number of the sensors.

2. The system of claim 1, wherein the controller is configured to determine the accident risk level further based on types of the sensors.

3. The system of claim 2, wherein:
  the plurality of sensors comprises an atmospheric pressure sensor configured to detect an up/down motion of the rotary-wing aircraft and a rotation detection sensor configured to detect a rotational motion of the rotary-wing,
  the controller is further configured to:
    determine that the accident risk level is high when both the atmospheric pressure sensor and the rotation detection sensor respectively detect the up/down motion and rotational motion of the rotary-wing aircraft; and
    determine that the accident risk level is low when only one of the atmospheric pressure sensor and the rotation detection sensor detects the up/down motion or rotational motion of the rotary-wing aircraft.

4. The system of claim 3, wherein the rotation detection sensor includes a geomagnetic sensor or a 6-axis sensor.

5. The system of claim 3, wherein the controller is further configured to:
  control the safety device to operate automatically when the determined accident risk level is high; and
  control the safety device to operate manually when the determined accident risk level is low.

6. The system of claim 1, wherein the controller is further configured to generate a warning when at least one of the detection values exceeds a predetermined value.

7. A method of operating a safety device for a rotary-wing aircraft, comprising:
  receiving, from a plurality of sensors, a plurality of detection values, each detection value indicating a motion of the rotary-wing aircraft detected by each sensor;
  determining an accident risk level during a flight of rotary-wing aircraft based on the plurality of detection values received from the plurality of sensors; and
  controlling the safety device to operate automatically or manually based on the determined accident risk level,
  wherein determining the accident risk level comprises:
    comparing each of the detection values with a predetermined value; and
    determining a number of the sensors outputting the detection value exceeding the predetermined value, and
  wherein determining the accident risk level further comprises:
    determining that the accident risk level is high when the number of the sensors outputting the detection value exceeding the predetermined value exceeds a half of a number of the sensors; and
    determining that the accident risk level is low when the number of the sensors outputting the detection value exceeding the predetermined value does not exceed the half of the number of the sensors.

8. The method of claim 7, further comprising determining the accident risk level further based on types of the plurality of sensors.

9. The method of claim 8, wherein:
  the plurality of sensors comprises an atmospheric pressure sensor configured to detect an up/down motion of the rotary-wing aircraft and a rotation detection sensor configured to detect a rotational motion of the rotary-wing aircraft, and
  the method further comprising:
    determining that the accident risk level is high when both the atmospheric pressure sensor and the rotation detection sensor respectively detect the up/down motion and rotational motion of the rotary-wing aircraft; and
    determining that the accident risk level is low when only one of the atmospheric pressure sensor and the rotation detection sensor detects the up/down motion or rotational motion of the rotary-wing aircraft.

10. The method of claim 9, wherein controlling the safety device to operate automatically or manually based on the determined accident risk level comprises:
  controlling the safety device to operate automatically when the determined accident risk level is high; and
  controlling the safety device to operate manually when the determined risk level is low.

11. The method of claim 10, further comprising generating a warning when at least one of the detection value exceeds a predetermined value.

* * * * *